(12) United States Patent
Nagasaka et al.

(10) Patent No.: US 10,309,686 B2
(45) Date of Patent: Jun. 4, 2019

(54) FORCED AIR SUPPLY TYPE OF COMBUSTION APPARATUS

(71) Applicant: RINNAI CORPORATION, Aichi (JP)

(72) Inventors: Toshimitsu Nagasaka, Nagoya (JP); Masakazu Ando, Nagoya (JP)

(73) Assignee: RINNAI CORPORATION, Aichi (JP)

( * ) Notice: Subject to any disclaimer, the term of this patent is extended or adjusted under 35 U.S.C. 154(b) by 44 days.

(21) Appl. No.: 15/888,352

(22) Filed: Feb. 5, 2018

(65) Prior Publication Data
US 2018/0245816 A1 Aug. 30, 2018

(30) Foreign Application Priority Data

Feb. 27, 2017 (JP) .................................. 2017-035080

(51) Int. Cl.
| F23C 7/00 | (2006.01) |
| F27B 5/16 | (2006.01) |
| F24H 1/14 | (2006.01) |
| F23L 5/02 | (2006.01) |
| F24H 8/00 | (2006.01) |
| F24H 1/00 | (2006.01) |

(52) U.S. Cl.
CPC ................ F24H 1/145 (2013.01); F23L 5/02 (2013.01); F24H 1/0027 (2013.01); F24H 8/00 (2013.01); *F23L 2900/00* (2013.01); *F24H 2210/00* (2013.01)

(58) Field of Classification Search
CPC ... F23C 6/045; F23C 5/00; F23C 7/00; B01D 2265/06; F01N 3/22; F23L 15/00; F24F 13/28; F26B 21/00; F27B 5/16
See application file for complete search history.

(56) References Cited

U.S. PATENT DOCUMENTS

| 4,836,182 A * | 6/1989 | Trowbridge | ............ F24H 3/087 126/109 |
| 4,919,123 A * | 4/1990 | Jackson | .................. F24F 13/28 126/110 R |
| 5,390,492 A * | 2/1995 | Levendis | ................ F01N 3/023 55/302 |

(Continued)

FOREIGN PATENT DOCUMENTS

JP        2007-285651 A        11/2007

*Primary Examiner* — Gregory A Wilson

(74) *Attorney, Agent, or Firm* — Cermak Nakajima & McGowan LLP; Tomoko Nakajima

(57) ABSTRACT

A forced air supply combustion apparatus sucks combustion air from an air supply port. An air filter for collecting foreign matters in the air is mounted on an air-supply-port-formed plate in an insertable and drawable manner. A filter frame is arranged to be brought into close contact with a peripheral part of the air supply port in a state of having mounted the air filter in position. The air-supply-port side edge parts are provided with retaining pieces to clamp a filter side frame part in the Z-axis direction against the side edge parts. A distance in the Z-axis direction between the air-supply-port side edge parts, and the retaining pieces is set larger than a dimension, in the Z-axis direction, of the filter side frame part, and is set smaller than a sum of the dimensions to be obtained by adding to said dimensions the projection height of the projections provided in a projecting manner.

2 Claims, 6 Drawing Sheets

(56) References Cited

U.S. PATENT DOCUMENTS

| | | | | |
|---|---|---|---|---|
| 8,167,610 B2 * | 5/2012 | Raleigh | ................... | F23D 14/58 |
| | | | | 126/116 R |
| 9,192,885 B2 * | 11/2015 | Blossey | ............. | B01D 46/0024 |
| 9,295,936 B2 * | 3/2016 | Krisko | ................... | B01D 45/12 |
| 9,459,022 B2 * | 10/2016 | Krupp | ..................... | F24H 3/025 |

\* cited by examiner

FORCED AIR SUPPLY TYPE OF COMBUSTION APPARATUS

BACKGROUND OF THE INVENTION

1. Technical Field

The present invention relates to a forced air supply type of combustion apparatus comprising: an exterior case having contained therein, a burner, a combustion box for enclosing a combustion space of air-fuel mixture ejected from the burner, and a combustion fan; an air-supply-port-formed plate having formed therein an air supply port through which outside air is introduced into an internal space of the exterior case, such that the air required for combustion is sucked by the combustion fan from the air supply port into the internal space of the exterior case.

2. Background Art

As this kind of forced air supply type of combustion apparatus, there is known in JP-A-2007-285651 one in which an air filter for collecting the foreign matters in the air is mounted on a plate for forming therein air supply port (hereinafter also called "air-supply-port-formed plate") in a manner to cover the air supply port. In this apparatus, the air filter is made up of a filter main body, and a filter frame to enclose the filter main body. The filter frame has claw parts formed in a projecting manner. Then, by making these claw parts engaged with a rear surface of the air-supply-port-formed plate through engaging holes formed in a peripheral part of the air supply port of the air-supply-port-formed plate, the air filter is mounted on the air-supply-port-formed plate.

Here, in order to facilitate the mounting and dismantling of the air filter, it is necessary to make the distance between the surface of contact of the filter frame with air-supply-port peripheral part and the claw part, slightly larger than the plate thickness of the air-supply-port-formed plate. As a result, in a state of having mounted the air filter in position, a small clearance occurs between the filter frame and the air-supply-port peripheral part. There are therefore cases where foreign matters enter the internal space through this clearance.

SUMMARY

Problems that the Invention is to Solve

In view of the above points, this invention has a problem of providing a forced air supply type of combustion apparatus which is capable of easily inserting and drawing an air filter into and out of an air-supply-port-formed plate and also which is capable of preventing the foreign matters from entering the apparatus by making a filter frame into close contact with a periphery of an air supply port in a state in which the air filter has been mounted in position.

Means for Solving the Problems

In order to solve the above problem, this invention is a forced air supply type of combustion apparatus comprising: an exterior case having contained therein, a burner, a combustion box for enclosing a combustion space of air-fuel mixture ejected from the burner, and a combustion fan; an air-supply-port-formed plate having formed therein an air supply port through which outside air is introduced into an internal space of the exterior case, such that the air required for combustion is sucked by the combustion fan from the air supply port into the internal space of the exterior case; and an air filter mounted on the air-supply-port-formed plate in a manner to cover the air supply port in an insertable and drawable manner, thereby collecting foreign matters in the air ("drawable" means "capable of being pulled out of position"). The air filter comprises: a filter main body; a filter frame to enclose the filter main body. Suppose that: a direction of inserting and drawing the air filter into, and out of, the air-supply-port-formed plate is defined as an X-axis direction; the direction of drawing the air filter is defined as an X-axis plus direction; the direction of thickness of the air filter is defined as a Z-axis direction; and the direction perpendicular to the X-axis direction and the Z-axis direction is defined as a Y-axis direction. Then, the combustion apparatus comprises: retaining pieces which are provided at side edge parts and which are elastically deformable by deflection in the Z-axis direction so as to support side frame parts on side edge parts by retaining the side frame parts in the Z-axis direction relative to the side edge parts while allowing the side frame parts insertable and drawable in the X-axis direction. Said side edge parts are elongated in the X-axis direction on both sides, in the Y-axis direction, of the air supply port in the air-supply-port-formed plate; and said side frame parts extend in the X-axis direction on both sides, in the Y-axis direction, of the filter frame. The air filter further comprises: projections in the Z-axis direction, partly formed in those surfaces of the side frame part which lie opposite to the retaining pieces, wherein a distance in the Z-axis direction between the side edge parts of the air-supply-port-formed plate and the retaining pieces is set to be larger than a dimension, in the Z-axis direction, of the side frame parts, and is set to be smaller than the dimension obtained by adding a projecting height of the projections to said dimension in the Z-axis direction of the side frame parts; and guide piece parts disposed at a front end, in the X-axis plus direction, of the retaining pieces in an inclined manner such that the distance in the Z-axis direction to the side edge parts of the air-supply-port-formed plate gradually increases toward the X-axis plus direction.

According to this invention, in a state in which the air filter has been mounted in position, the projections in the side frame parts of the filter frame come into contact with the retaining pieces, so that the retaining pieces are pushed by the projections for deformation by deflection in the Z-axis direction. Then, as a result of a reaction force of deformation of the retaining pieces, the filter frame is pushed in the Z-axis direction so as to come into close contact with the peripheral part of the air supply port. Accordingly, no clearance in the Z-axis direction will be generated between the filter frame and the peripheral part of the air supply port and, therefore, the foreign matters can be prevented from entering the clearance. In addition, since the distance in the Z-axis direction between the side edge parts (air-supply-port side edge parts) of the air-supply-port-formed plate and the retaining pieces is set to be larger than the dimension, in the Z-axis direction, of the side frame parts, it will be only the projections that come into strong contact with the retaining pieces. As a result, the frictional resistance at the time of inserting the side frame parts into the clearance between the air-supply-port side edge parts and the retaining pieces can be reduced. Still furthermore, the guiding function at the time of inserting the side frame parts into the clearance between the air-supply-port side edge parts and the retaining pieces can be obtained by the guide piece parts. Therefore, the air filter can be easily inserted into, and drawn from, the air-supply-port-formed plate, whereby the workability of inserting and drawing the air filter is improved.

Further, in this invention, preferably, the exterior case is constituted by: a case main body of a box shape with a front face thereof being left open; and a front cover to be attached to the front face of the case main body. Suppose that the X-axis direction, the X-axis plus direction, the Y-axis direction and the Z-axis direction correspond to a front-to-back direction, a front side, a left-and-right direction, and an up-and-down direction, respectively. Then, a riser part is vertically formed at a front end of the filter frame, and the air-supply-port-formed plate is provided with a filter positioning part with which the riser part comes into contact in a state in which the air filter is mounted in position. The front cover is provided with a filter presser part which is disposed in contact with the riser part to prevent the air filter from getting pulled out forward. According to this arrangement, as a result of contacting of the riser part with the filter positioning part, the positioning of the air filter in the direction of insertion is fixed. Therefore, the air filter can surely be positioned in a predetermined mounting position. In addition, fixing tools such as screws, and the like for fixing in position the air filter are no longer needed. As a result, the workability of inserting and drawing the air filter is further improved and the cost reduction can be attained.

PREFERRED EMBODIMENTS FOR CARRYING OUT THE INVENTION

Figure 1:
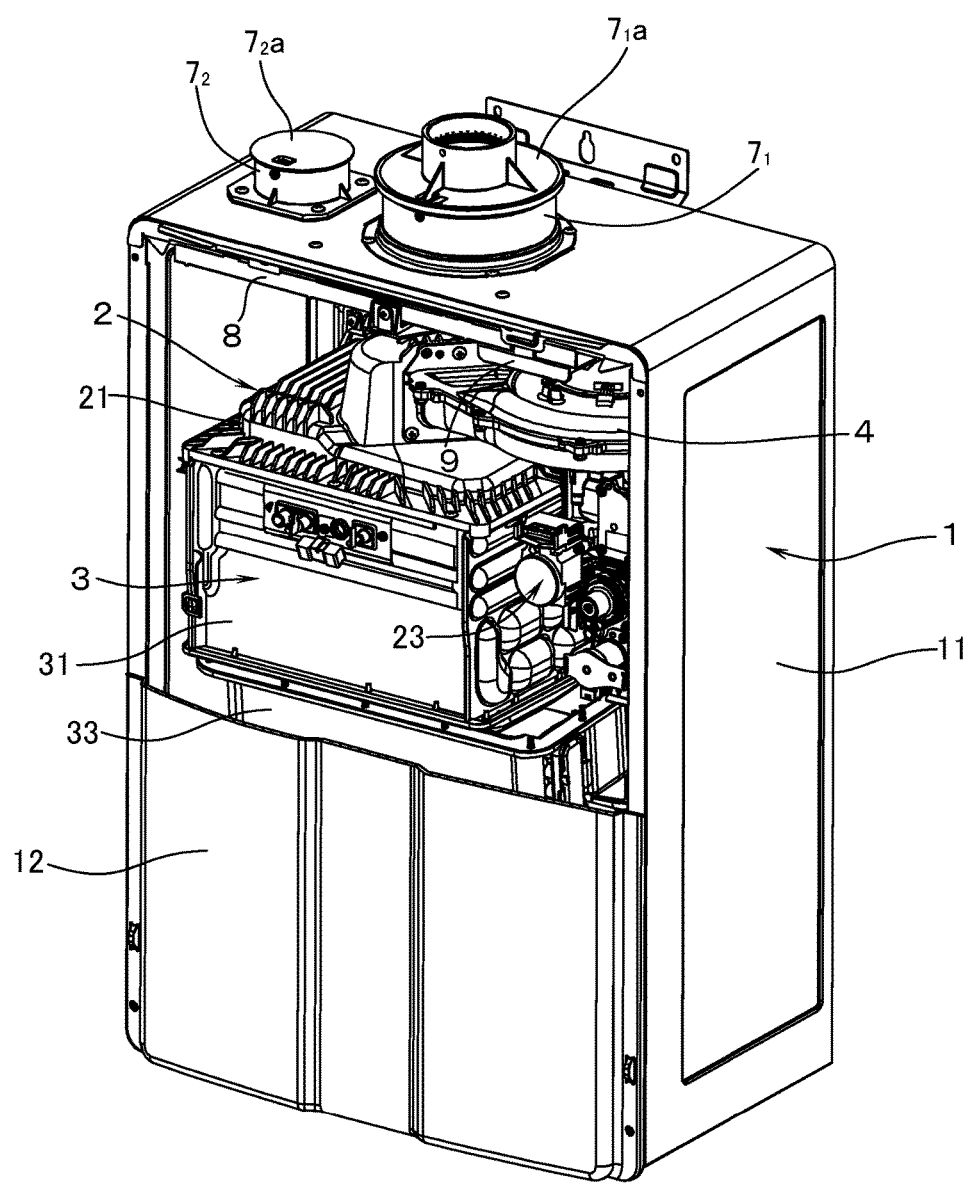
FIG. 1 is a perspective view of a combustion apparatus of an embodiment of this invention.
Figure 2:
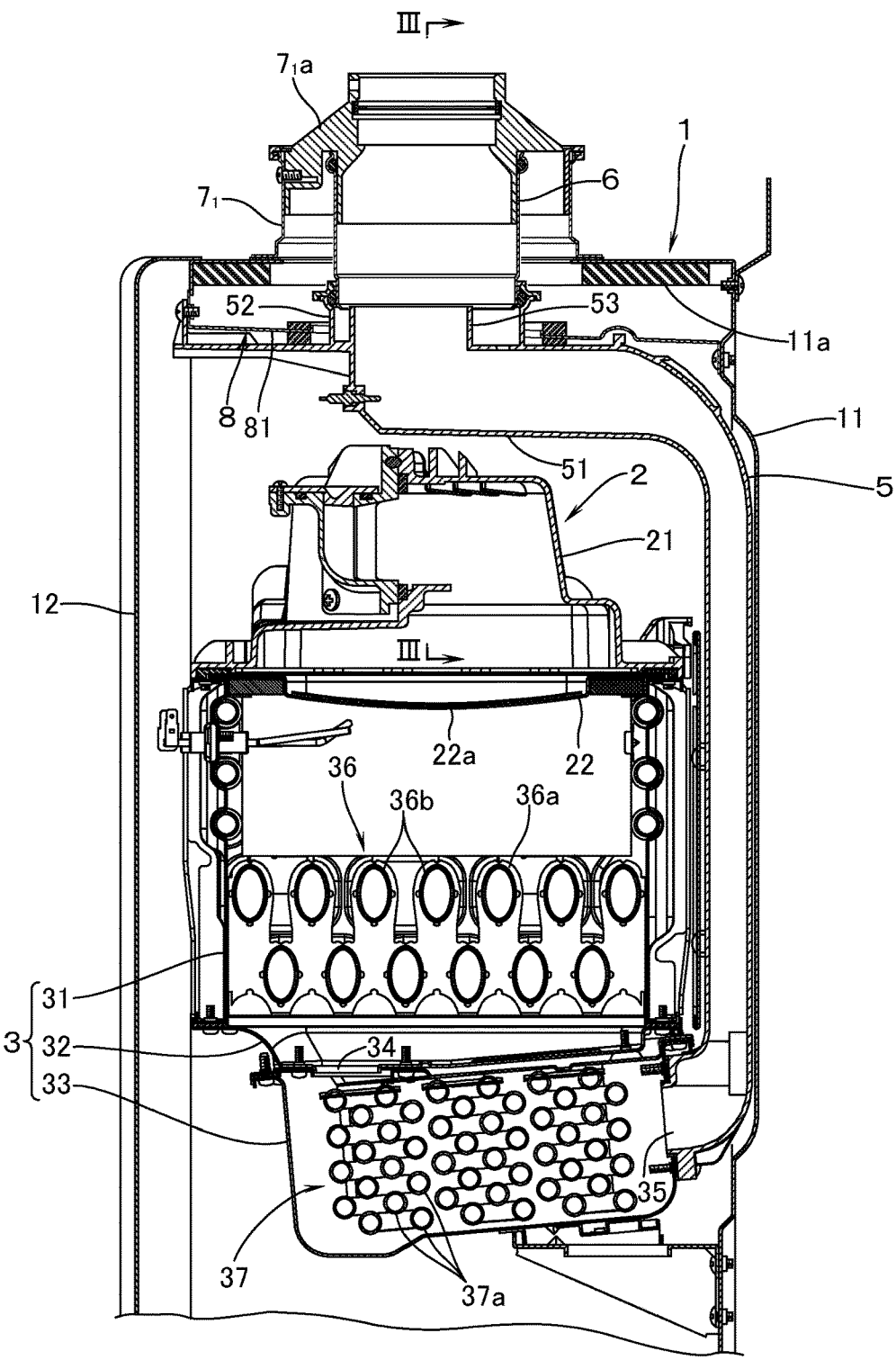
FIG. 2 is a cut-away sectional view of an essential portion of the combustion apparatus of the embodiment.

With reference to FIGS. 1 and 2, a forced air supply type of combustion apparatus according to an embodiment of this invention is provided with an exterior case 1. Inside the exterior case 1 there are housed: a burner 2 for ejecting downward air-fuel mixture; a combustion box 3, under the burner 2, for enclosing a space of combustion of air-fuel mixture ejected from the burner 2; a combustion fan 4; and an exhaust duct 5 through which exhaust gas discharged from the combustion box 3 flows. The exterior case 1 is constituted by a case main body 11 of a box shape with a front face thereof being left open, and a front cover 12 which is attached to the front face of the case main body 11.

The burner 2 is provided with: a box-shaped burner body 21 which opens downward; and a combustion plate 22 which covers the downward-looking opening surface of the burner body 21. To an upper portion of the burner body 21, a combustion fan 4 is connected. The combustion fan 4 is connected to a downstream side of a premixing device 23 which generates air-fuel mixture by mixing fuel gas with air to be supplied from an air supply pipe (described later) into the internal space of the exterior case 1. Then, the air-fuel mixture from the premixing device 23 is supplied through the combustion fan 4 into the burner body 21. This air-fuel mixture is ejected downward from an air-fuel mixture ejection part 22a which is disposed in the combustion plate 22, thereby performing totally primary air combustion (combustion requiring no secondary air).

The combustion box 3 is constituted by: an upper box 31 whose upper end part is fastened to the lower-surface peripheral edge part of the burner body 21 and also whose both the upper and lower surfaces are left open; a flat, dish-shaped intermediate box 32 which is fastened to the lower end of the upper box 31; and a lower box 33 which has an upper plate part to be fastened to the bottom plate part of the intermediate box 32 and also whose both upper and lower surfaces are closed. At front parts of the bottom plate part of the intermediate box 32 and of the upper plate part of the lower box 33, there is formed a ventilation port 34 which brings into communication with each other the inner space of the intermediate box 32 and the inner space of the lower box 33. Further, at the rear of the lower box 33, there is formed an exhaust port 35. In this arrangement, the combustion gas is arranged to flow from the inside of the upper box 31, through the inside of the intermediate box 32, the ventilation port 34, the inside of the lower box 33, and the exhaust port 35 into the exhaust duct 5.

Inside the upper box 31, there is disposed a main heat exchanger 36 of a fin and tube type which is made up of a multiplicity of heat-absorbing fins 36a and a plurality of heat absorbing pipes 36b which pass through the heat absorbing fins 36a. Further, inside the lower box 33, there is disposed a subsidiary heat exchanger 37 of latent-heat recovery type which is made up of a plurality of upper and lower heat-absorbing pipes 37a elongated in a front-to-back direction in a snaking manner. After having been heated in the subsidiary heat exchanger 37, water is further heated in the main heat exchanger 36 so that hot water at a set temperature can be supplied to hot-water supply terminal.

Figure 3:
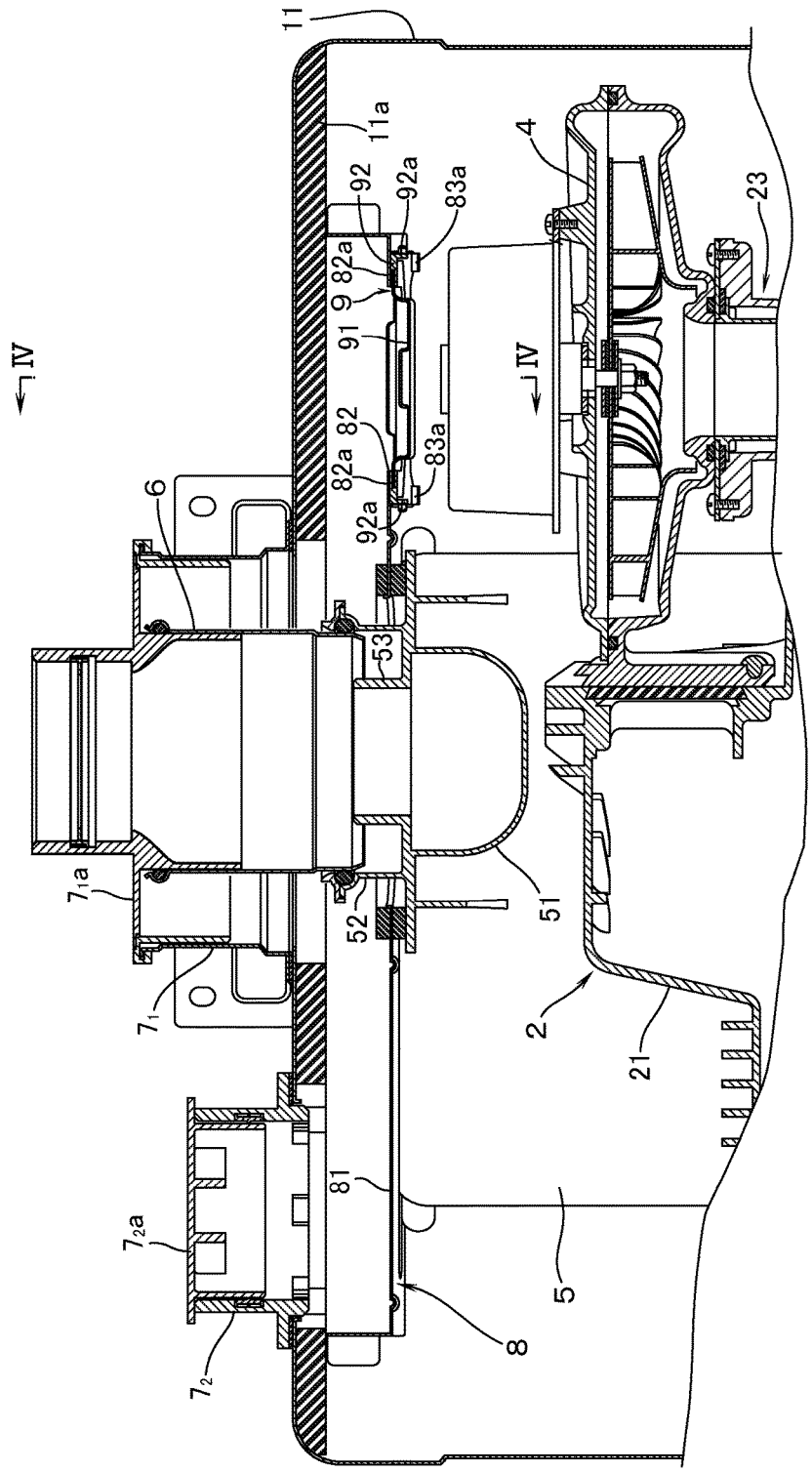
FIG. 3 is an enlarged sectional view cut away along the line III-III in FIG. 2.
Figure 4:
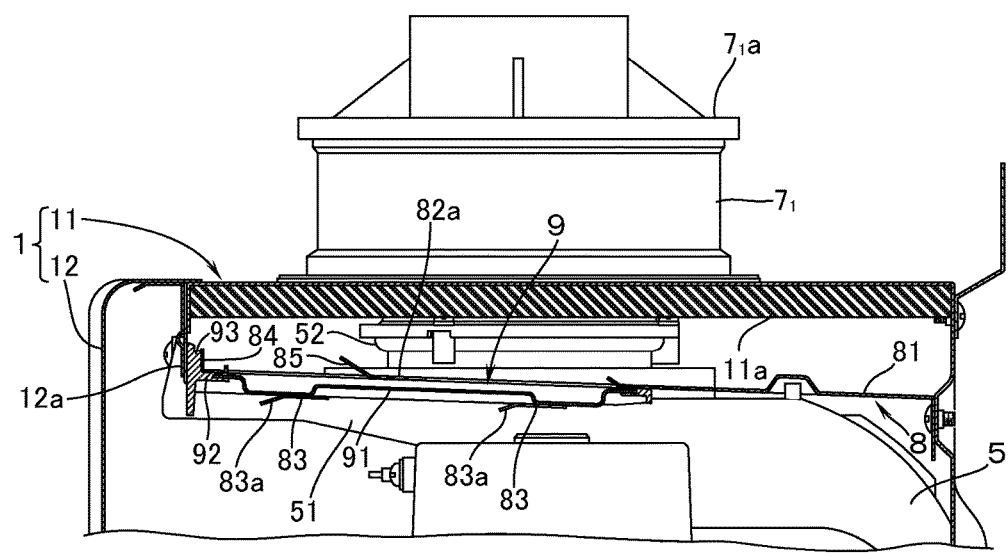
FIG. 4 is a sectional side view of an essential portion cut away along the line IV-IV in FIG. 3.

With reference also to FIG. 3, an upper surface of the exterior case 1 has formed therein: in a central part of the right-and-left direction, a cylindrical exhaust connection port 6 to which is connectable an exhaust pipe (not illustrated) extending outdoors; and a first cylindrical air supply connection port $7_1$ which is connectable to an air supply pipe (not illustrated) of double-pipe system having contained therein an exhaust pipe and which encloses the exhaust connection port 6. On the upper surface of the exterior case 1, in a position deviated to the left, there is further disposed a second cylindrical air supply connection port $7_2$ to which is connectable an air supply pipe (not illustrated) of twin-pipe system, the air supply pipe being separate from, and independent of, the exhaust pipe. The exhaust connection port 6 is supported by the exhaust duct 5 in a state in which the lower end part of the exhaust connection port 6 is fitted into a connection tube 52 that is vertically disposed on an upper surface of a bent part 51 that is bent to the forward at the upper end of the exhaust duct 5. Further, the bent part 51 is provided with an exhaust outlet 53 facing the exhaust connection port 6, in a position inside the connection tube 52. The exhaust connection port 6 is thus arranged to be brought into communication with the exhaust duct 5 through the exhaust outlet 53. Still furthermore, each of the first and the second air supply connection ports $7_1$, $7_2$ has mounted thereon respective lid members $7_1a$, $7_2a$ that close the air supply connection ports. In case an air supply pipe of double-pipe system is used, the air supply pipe of double-pipe system is connected to the first air supply connection port $7_1$ in a state of having removed the lid member $7_1a$. On the other hand, in case an air supply pipe of twin-pipe system is used as the air supply pipe, the air supply pipe of twin-pipe system is connected to the second air supply connection port $7_2$ in a state of having removed the lid member $7_2a$.

Figure 5:
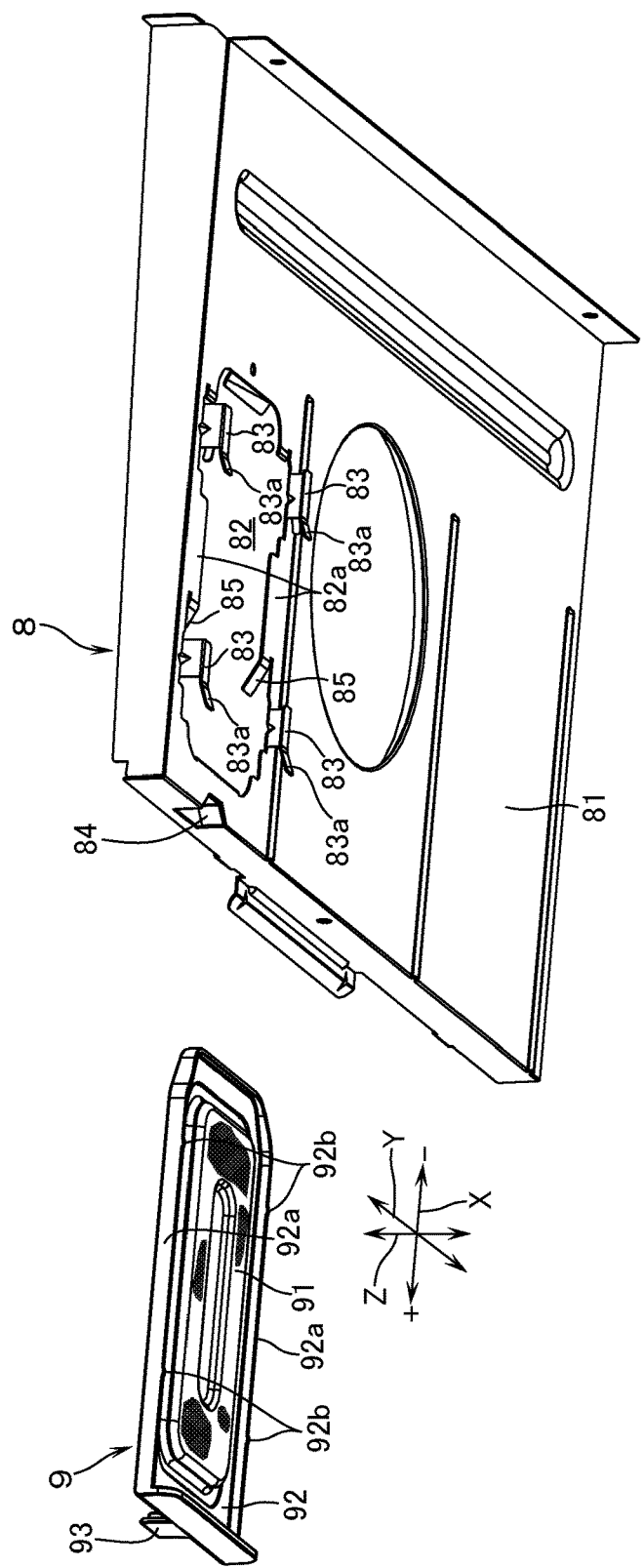
FIG. 5 is a perspective view of the air supply box and the air filter.

Inside the exterior case 1 there is disposed an air supply box 8 which is, in a manner to lie along the upper plate part of the exterior case 1, in communication with both the first and the second air supply connection ports $7_1$, $7_2$. The upper surface of the air supply box 8 is sealed by a packing 11a which is mounted on a lower surface of the upper plate part of the exterior case 1. With reference also to FIG. 5, a bottom plate 81 of the air supply box 8 has formed therein an air supply port 82 which introduces, into the internal space of the exterior case 1, the air from an arbitrary air supply connection port out of both the first and second air supply connection ports $7_1$, $7_2$. It is thus so arranged that, due to the negative pressure acting on the upstream end air suction port of the premixing device 23 as a result of the operation of the combustion fan 4, the air necessary for combustion (primary air for combustion) is sucked from the air supply port 82 into the internal space of the exterior case 1. The bottom plate 81 which serves as a plate for forming therein the air supply port 82 (also referred to as air-supply-port-formed plate), has mounted thereon an air filter 9 for collecting the foreign matters in the air, in a manner to cover the air supply port 82 and also in an insertable and drawable manner.

The air filter 9 has a meshed filter main body 91, and a filter frame 92 which encloses the filter main body 91. Suppose that: a direction of inserting and drawing the air filter 9 relative to the bottom plate 8 is defined as an X-axis direction; the direction of drawing and the direction of inserting the air filter 9 are respectively defined as an X-axis plus direction and an X-axis minus direction; the direction of the filter thickness is defined as a Z-axis direction; and a direction perpendicular to the X-axis direction and the Z-axis direction is defined as a Y-axis direction. Then side edge parts 82a along the X-axis direction on both sides in the Y-axis direction of the air supply port 82 in the bottom plate 81 (hereinafter also referred to as air-supply-port side edge parts) are provided with retaining (or clamping) pieces 83 which support the side frame parts 92a that extend along the X-axis direction on both sides in the Y-axis direction of the filter frame 92 in a manner to be retained (or clamped) so as to be insertable and drawable in the X-axis direction relative to the air-supply-port side edge parts 82a.

Figure 6:
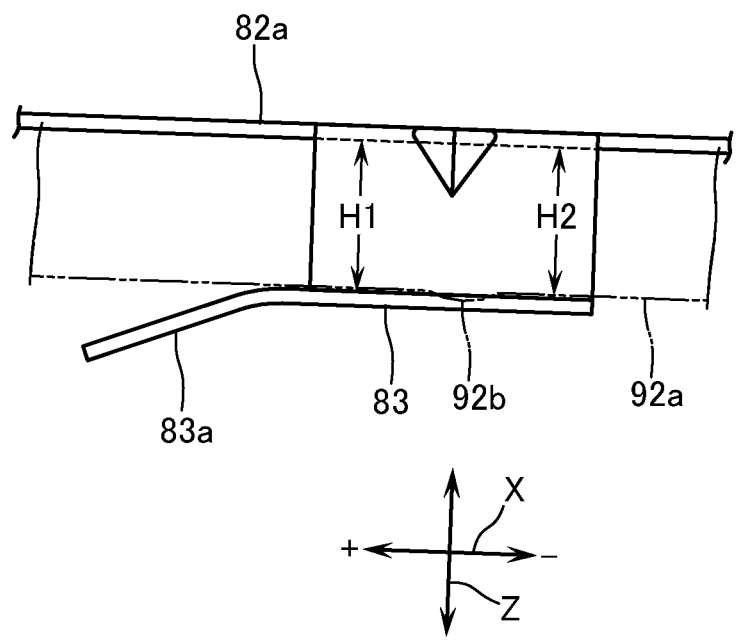
FIG. 6 is an enlarged sectional side view of a portion of installing the retaining piece of the combustion apparatus of the embodiment.

Each of the retaining pieces 83 is formed by bending, in the Z-axis direction, part of the air-supply-port side edge parts 82a and then bending thus obtained semi-finished product inward in the Y-axis direction. Therefore, the retaining pieces 83 are elastically deformable by deflection in the Z-axis direction. In part of that surface of the side frame parts 92a which lies opposite to the retaining pieces 83, there are formed projections 92b in the Z-axis direction. The retaining pieces 83 are disposed in a pair at a distance, in the X-axis direction, from each other at the air-supply-port side edge parts 82a on each side of the Y-axis direction. Therefore, the projections 92b are also formed on each side, in the Y-axis direction, of the side frame parts 92a in a pair at a distance from each other in the X-axis direction. Further, as shown in FIG. 6, the distance H1 in the Z-axis direction between the air-supply-port side edge parts 82a and the retaining pieces 83 are set to be larger than the dimension H2 in the Z-axis direction of the side frame parts 92a, and is set to be smaller than the sum of the dimensions to be obtained by adding the projection height of the projections 92b to the dimension H2 in the Z-axis direction of the side frame parts. Further, at the end part, in the X-axis plus direction, of each of the retaining pieces 83, guide piece parts 83a are disposed such that the distance in the Z-axis direction to the air-supply-port side edge parts 82a gradually increases toward the X-axis plus direction.

According to the above-mentioned arrangement, in a state in which the air filter 9 has been mounted in position, the projections 92b in the side frame parts 92a of the filter frame 92 come into contact with the retaining pieces 83 and, as a result of a push on the retaining pieces 83 by the projections 92b, the retaining pieces 83 will be subjected to deformation by deflection in the Z-axis direction. Then, by the deformation reaction force of the retaining pieces 83, the filter frame 92 is pushed in the Z-axis direction so that the filter frame 92 comes into close contact with the peripheral part of the air supply port 82. Therefore, no clearance in the Z-axis direction will be generated between the filter frame 92 and the peripheral edge part of the air supply port 82 and, therefore, the foreign matters can be prevented from entering the clearance. Further, since the distance H1 in the Z-axis direction between the air-supply-port side edge parts 82a and the retaining pieces 83 is set to be larger than the dimension H2 in the Z-axis direction of the side frame parts 92a, it will be only the projections 92b that come into strong contact with the retaining pieces 83. As a result, the frictional resistance at the time of inserting the side frame parts 92a into the clearance between the air-supply-port side edge parts 82a and the retaining pieces 83 will be reduced. Furthermore, there can be obtained a guiding function by the guide piece parts 83a when the side frame parts 92a are inserted into the clearance between the air-supply-port side edge parts 82a and the retaining pieces 83. Therefore, the air filter 9 can be easily inserted into, and drawn out of, the bottom plate 81, thereby improving the workability of inserting and drawing the air filter 9.

Just for the purpose of information, the above-mentioned X-axis direction, X-axis plus direction, Y-axis direction and Z-axis direction respectively refer to the front-to-back direction (strictly speaking, inclination from horizontal to slight inclination with rear side down), front side, left-and-right direction and vertical direction (strictly speaking, inclination from vertical up-and-down direction with slight inclination with rear side down). In this embodiment, a riser part 93 is vertically disposed at the front end of the filter frame 92 and, at the front end of the bottom plate 81, a filter positioning part 84 is disposed so as to come into contact with the riser part 93 in a state in which the air filter 9 has been mounted in position. The front cover 12 is provided with a filter presser part 12a to prevent, by remaining in contact with the riser part 93, the air filter 9 from getting unintentionally pulled out forward.

According to this arrangement, as a result of contact of the riser part 93 with the filter positioning part 84, the air filter 9 can be fixed in position in the direction of inserting the air filter 9. Therefore, the air filter 9 can surely be fixed in position in a predetermined mounting position. Further, fixing tools such as screws, and the like for fixing in position the air filter 9 become needless, and the workability of inserting and drawing the air filter 9 is further improved and the cost reduction can be attained.

By the way, the air-supply-port side edge parts 82a are provided with guide parts 85 which are inclined with the front looking slightly upward, the guide parts 85 being positioned at the back of the front-side retaining pieces 83. In this arrangement, when the air filter 9 is inserted into the top of the front-side retaining pieces 83 in an inclined posture with the rear side of the air filter being raised, the rear end part of the filter frame 92 is guided by the guide parts 85 so as to be guided backward without going through the upward of the air-supply-port side edge parts 82*a*.

Descriptions have so far been made of embodiments of this invention with reference to the accompanying drawings. This invention shall, however, be not limited to the above. For example, in this embodiment, the air-fuel mixture to be supplied from the premixing device 23 through the combustion fan 4 is arranged to be ejected from the burner 2 to perform totally primary air combustion. This invention can similarly be applied to a combustion apparatus using a burner of Bunsen combustion type requiring the secondary air. In addition, in the above-mentioned embodiment, the X-axis direction, Y-axis direction and Z-axis direction mean the front-to-back direction, left-and-right direction and vertical direction, respectively, but shall not be limited to the above. For example, the X-axis direction may be right-to-left direction or the up-and-down direction. Further, this invention can similarly be applied to a forced air supply type of combustion apparatus other than for hot water supply, such as for a fan heater and the like.

EXPLANATION OF MARKS

1 exterior case
11 case main body
12 front cover
12*a* filter presser part
2 burner
3 combustion box
4 combustion fan
8 air supply box
81 bottom plate (plate for forming therein air supply port; also called "air-supply-port-formed plate")
82 air supply port
82*a* side edge parts of air supply port (air-supply-port side edge parts)
83 retaining pieces (clamping pieces)
83*a* guide piece parts
84 filter positioning part
9 air filter
91 filter main body
92 filter frame
92*a* side frame parts
92*b* projections
93 riser part

What is claimed is:

1. A forced air supply type of combustion apparatus comprising:
   an exterior case having contained therein, a burner, a combustion box for enclosing a combustion space of air-fuel mixture ejected from the burner, and a combustion fan; an air-supply-port-formed plate having formed therein an air supply port through which outside air is introduced into an internal space of the exterior case, such that the air required for combustion is sucked by the combustion fan from the air supply port into the internal space of the exterior case; and an air filter mounted on the air-supply-port-formed plate in a manner to cover the air supply port in an insertable and drawable manner, thereby collecting foreign matters in the air,
   wherein the air filter comprises:
   a filter main body;
   a filter frame to enclose the filter main body, supposing that: a direction of inserting and drawing the air filter into, and out of, the air-supply-port-formed plate is defined as an X-axis direction; the direction of drawing the air filter is defined as an X-axis plus direction; the direction of thickness of the air filter is defined as a Z-axis direction; and the direction perpendicular to the X-axis direction and the Z-axis direction is defined as a Y-axis direction;
   retaining pieces which are provided at side edge parts and which are elastically deformable by deflection in the Z-axis direction so as to support side frame parts on side edge parts by retaining the side frame parts in the Z-axis direction relative to the side edge parts while allowing the side frame parts insertable and drawable in the X-axis direction,
   said side edge parts being elongated in the X-axis direction on both sides, in the Y-axis direction, of the air supply port in the air-supply-port-formed plate;
   said side frame parts extending in the X-axis direction on both sides, in the Y-axis direction, of the filter frame;
   projections in the Z-axis direction, partly formed in those surfaces of the side frame part which lie opposite to the retaining pieces,
   wherein a distance in the Z-axis direction between the side edge parts of the air-supply-port-formed plate and the retaining pieces is set to be larger than a dimension, in the Z-axis direction, of the side frame parts, and is set to be smaller than a sum of the dimensions to be obtained by adding the projection height of the projections to the dimension in the Z-axis direction of the side frame parts; and
   guide piece parts disposed at a front end, in the X-axis plus direction, of the retaining pieces in an inclined manner such that the distance in the Z-axis direction to the side edge parts of the air-supply-port-formed plate gradually increases toward the X-axis plus direction.

2. The forced air supply type of combustion apparatus according to claim 1, wherein the exterior case is constituted by:
   a case main body of a box shape with a front face thereof being left open; and
   a front cover to be attached to the front face of the case main body, supposing that the X-axis direction, the X-axis plus direction, the Y-axis direction and the Z-axis direction correspond to a front-to-back direction, a front side, a left-and-right direction, and an up-and-down direction, respectively,
   wherein: a riser part is vertically formed at a front end of the filter frame;
   the air-supply-port-formed plate is provided with a filter positioning part with which the riser part comes into contact in a state in which the air filter is mounted in position; and
   the front cover is provided with a filter presser part which is disposed in contact with the riser part to prevent the air filter from getting pulled out forward.

* * * * *